United States Patent [19]

Ulvestad

[11] 4,443,237
[45] Apr. 17, 1984

[54] DUST COLLECTING FILTER CARTRIDGE AND ATTACHMENT STRUCTURE FOR SUSPENDING SAME FROM BAGHOUSE TUBE SHEET

[75] Inventor: Edward A. Ulvestad, Naperville, Ill.

[73] Assignee: Flex-Kleen Corporation, Chicago, Ill.

[21] Appl. No.: 443,389

[22] Filed: Nov. 22, 1982

[51] Int. Cl.³ .............................................. B01D 46/52
[52] U.S. Cl. ........................................ 55/379; 55/498; 55/502; 55/507; 55/509; 55/302
[58] Field of Search ............. 55/302, 341 R, 374–379, 55/498, 502, 507, 509, 510; 210/323.2, 451, 452; 285/239, DIG. 22

[56] References Cited

U.S. PATENT DOCUMENTS

| 4,073,632 | 2/1978 | Reinauer et al. | 55/374 |
| 4,218,227 | 8/1980 | Frey | 55/302 |
| 4,256,473 | 3/1981 | DeMartino | 55/379 |
| 4,276,069 | 6/1981 | Miller | 55/379 |
| 4,291,904 | 9/1981 | Iversen et al. | 55/378 |
| 4,292,057 | 9/1981 | Ulvestad et al. | 55/379 |
| 4,319,897 | 3/1982 | Labadie | 55/302 |
| 4,322,231 | 3/1982 | Hilzendeger et al. | 55/378 |

*Primary Examiner*—David L. Lacey
*Attorney, Agent, or Firm*—Paul & Paul

[57] ABSTRACT

A filter cartridge is suspended from a baghouse tube sheet by an array of generally vertical spring metal fingers which are welded to the upper edge of the filter cartridge. Each of the fingers has an inward projection, a bag cup having an external annular groove is suspended from the tube sheet. The filter cartridge is installed by pushing it upwardly toward the tube sheet. When the lowermost edge of the bag cup is engaged by the inward projections on the fingers, the fingers are cammed outwardly and the inward projections ride on the wall of the bag cup until they come into registry with the annular groove in the bag cup at which time they snap into the groove, thus latching the filter cartridge. A hosetype clamp secures the filter cartridge after it has snapped into latched position.

9 Claims, 5 Drawing Figures

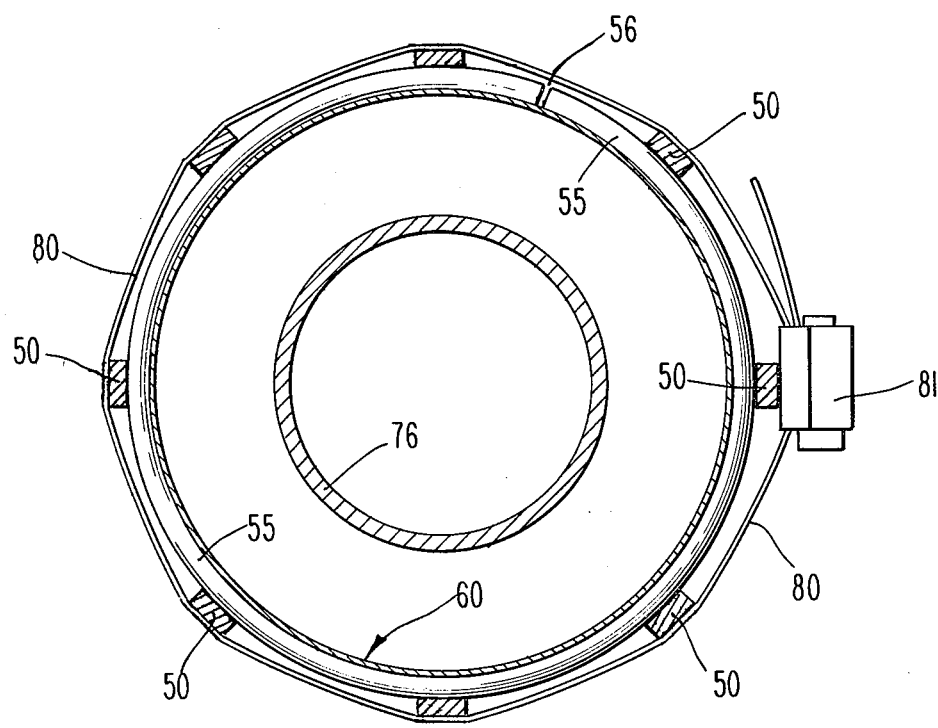
*Fig. 2*
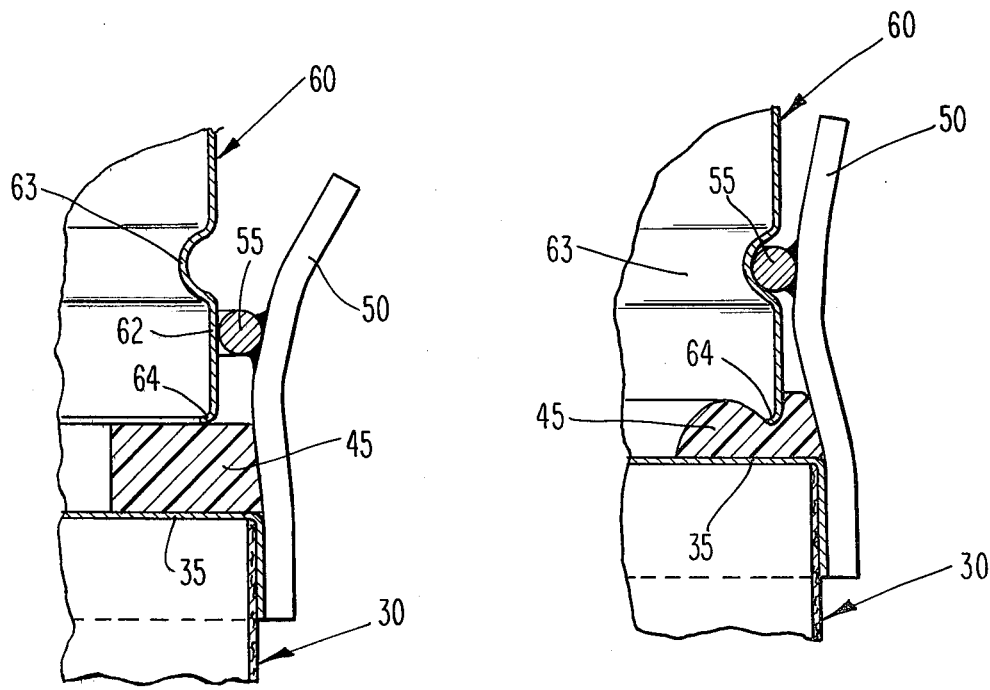
*Fig. 3*  *Fig. 4*

DUST COLLECTING FILTER CARTRIDGE AND ATTACHMENT STRUCTURE FOR SUSPENDING SAME FROM BAGHOUSE TUBE SHEET

BACKGROUND OF THE INVENTION

This invention relates to a filter media for apparatus for commercial or industrial use in removing particulate matter, such as dust, from a stream of gas, such as air, by cartridge filtration.

In dust filtering apparatus, a baghouse is used which, in the prior art, usually houses an array of cylindrical filter bags suspended from a tube sheet. However, in some prior art installations, an array of filter cartridges, instead of filter bags, have been used.

A dust filter bag is a tubular bag of cylindrical cross section, usually made of fabric which permits passage of air therethrough into the interior of the bag but obstructs passage of dust therethrough. The dust collects on the outer surface of the fabric and from time to time is removed, as by a blast of reverse air.

A filter cartridge, as distinguished from a filter bag, includes an inner perforated tubular sleeve or tube, usually of metal, which is surrounded by an annular filter media, usually of paper, for example, resin impregnated paper. In the prior art, the paper filter media has been pleated for the purpose of increasing the total surface area of the media and to permit the cartridge to be of shorter length than would otherwise be required.

The filter bags or filter cartridges, as the case may be, are suspended in a baghouse which is divided into two sections, a lower dust-laden air chamber, and an upper clean-air chamber. The two chambers are separated by a tube sheet having rows of spaced holes, each of which is in registry with one of the filter bags or filter cartridges. The dust-laden air is blown or drawn upwardly and passes through the wall of the filter bag or cartridge into the interior thereof. The dust does not pass through and collects on the outer surface of the fabric of the filter bag or on the outer surface of the pleated paper media of the cartridge. The dust-free air continues on, upwardly through the open mouths of the bags or cartridges through the holes in the tube sheet and into the upper or clean-air chamber.

Over a period of time, the collection of dust on the outer surface of the bag or cartridge, unless removed, would impede, and eventually prevent, flow of air through the wall and into the interior of the filter bag or cartridge.

The prior art has provided methods for removing the accumulation of dust from the outer wall. Pressurized air is blown in a reverse direction through the bag or cartridge. This is done by injecting a blast of air under pressure into the mouth of the bag to cause it to flow downwardly and outwardly through the fabric or paper wall, thereby to dislodge the dust accumulated on the outer surface of the wall and cause it to fall into a receptacle at the bottom of the lower chamber of the baghouse. A venturi is used to amplify the reverse air.

The prior art has also provided a pneumatic pulse jet system which provides continuous automatic cleaning of the baghouse but cleans only one row of bags or cartridge at a time. Using a timed cycle, a burst of compressed air is directed down through the venturi at the top of each bag in a single row. This induces clean air into the bag setting up a pneumatic shock wave inside. The air flow upwardly through the bag is momentarily stopped and the bag is flexed outwardly, causing accumulated dust particles to drop off into the collector hopper. Since only one row of bags is subjected to the blast of compressed air at a time, there is no interruption of air flow upwardly through the other filter bags or cartridges. This system provides a smooth operating dust control or material handling system.

Prior art filter cartridge systems have been capable of filtering relatively small concentrations of dust or fumes from slow moving air stream, but have not been capable of filtering large concentrations of dust from fast moving air streams. The reason for the inability of the prior art filter cartridge system to handle fast moving air streams carrying large concentrations of dust is the fact that the prior art system has used large diameter cartridge elements having a large number of deep closely-spaced pleats forming a large number of small-angled dust-collecting pockets. The dust becomes so lodged in the deep small-angle pockets that it cannot be effectively removed by the reverse jet air blast. This reduces the effective area of the filter media and has forced the prior art cartridges to have large areas of filter media for each cartridge element. Such large filter elements, when laden with dust become heavy and filter element replacement is made more difficult.

The efficiency and effectiveness of the filter cartridge can be increased by using a cartridge of relatively small diameter with filter media having a relatively small number of pleats of relatively short length, but substantially wider dust angles.

An important advantage of the small-diameter filter cartridge is that it may be installed in existing baghouses to replace the closely spaced filter bags now contained in such baghouses. As described previously herein, a typical filter bag has a diameter of about six inches. In contrast thereto, many prior art filter cartridge have an outside diameter of the order of twelve inches and thus cannot be used to replace filter bags in existing baghouses. Such baghouses may have as many as 500 filter bags in closely spaced rows and, it is an important practical advantage to be able to replace each small-diameter filter bag with a filter cartridge without having to replace the tube sheet.

The present application describes and claims mechanical attachment structure adapted for installing the small-diameter filter cartridge in baghouses, including existing baghouses in which the filter elements are closely spaced filter bags.

As used in the claims, the term "small-diameter filter cartridge" means a filter cartridge having a diameter of the order of six inches.

BRIEF DESCRIPTION OF THE DRAWINGS

FIG. 2 is a view in section looking down along the line 2—2 of FIG. 1.

FIG. 3 is a detailed view of a fragment of the attachment means showing the filter cartridge being installed, i.e., before the annular wire snaps into the annular groove of the bag cup to secure the filter cartridge to the cup.

FIG. 4 is a view similar to that of FIG. 3 but showing the filter cartridge fully installed with the annular wire in place in the annular groove of the bag cup.

DETAILED DESCRIPTION OF THE PREFERRED EMBODIMENTS

Figure 1:
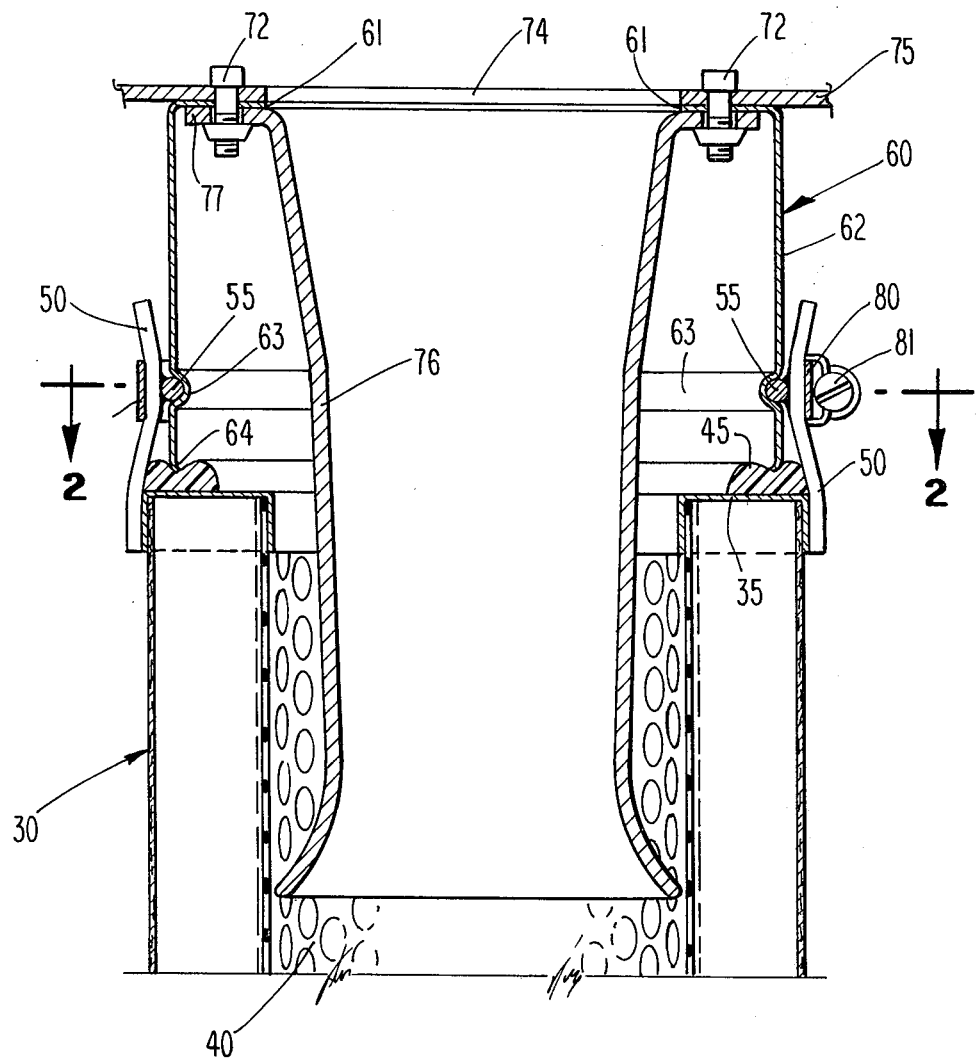
FIG. 1 is a elevational view of an attachment structure for installing and removing the small-diameter filter cartridge where the maintenance man has access to the lower chamber of the baghouse.

Referring first to the embodiment shown in FIG. 1, a cylindrical bag cup 60 is shown suspended from the tube sheet 75, in registry with one of the holes 74 in the tube sheet, by means of rivets 72 which pass through the horizontal inward flange 61 of the bag cup. The rivets 72 also support a venturi nozzle 76 which is suspended by means of its outwardly extending flange 77 through which the rivets 72 also pass. The bag cup 60 is provided with an annular groove 63 at a location above the lowermost end 64 of the sidewall 62 of the bag cup. The lowermost end 64 of the sidewall 62 of the bag cup is curved inwardly for reasons which will become clear.

The annular cuff 45 is secured, as by suitable adhesive, to the upper surface of an annular metal collar 35 of inverted channel-like cross section, which in turn is secured as by suitable adhesive to the upper surface of the pleated filter media 30 which encircles the perforated cylindrical metal sleeve 40 of the filter cartridge.

In accordance with the present invention, a series of generally vertical flat spring metal fingers 50 are secured, as by welding, to the outer wall of the collar 35 to form a circular assembly of such fingers. The number of such fingers may preferably be in the six to ten range. Eight such fingers are illustrated in FIG. 2.

Secured, as by welding, to the inner surface of each of the fingers 50 is a split annular wire 55 which, as seen in FIG. 2, is discontinuous, as at 56. As will become clear, annular wire 55 performs a camming function and a latching function.

Embracing the cylindrical assembly of vertical fingers 50, at the level of the annular wire 55, is a clamping strap or band 80 which is tightened by turning the clamp screw 81. The clamp may be similar to a conventional hose clamp, such as is used on an automobile radiator hose.

FIGS. 3 and 4 illustrate the manner in which the filter cartridge comprising the pleated filter media 30 and the perforated cylindrical metal sleeve 40 is installed by the maintenance man working in the lower chamber of the baghouse, using the attachment means of the present application. It is to be noted that the bag cup 60 and venturi nozzle 76 remain in place and are not disturbed during installation and removal of the filter cartridge.

To install the filter cartridge, the cartridge is pushed upwardly, the construction being such that before the under surface of annular plastic cuff 45, which is glued to the collar 35, comes into contact with the lower edge of bag cup 60, the annular wire 55 has come into contact with, and been cammed radially outward by, the inwardly curved lowermost edge 64 and vertical wall 62 of bag cup 60, thereby camming outwardly the spring metal fingers 50, as illustrated in FIG. 3.

When the maintenance man continues to push the filter cartridge upwardly, beyond the position shown in FIG. 3, the annular wire 55 on the spring metal fingers 50, snaps into the annular recess 63 in the bag cup, as shown in FIG. 4, thereby latching the filter cartridge to the bag cup. In this position, the inwardly curved lower edge 64 of the vertical wall 62 of the bag cup, which has performed a camming function, as just described, presses into the annular plastic cuff 45, thereby effecting a dust-tight seal. The maintenance man then installs and tightens the clamping strap 80, thereby to securely latch the filter cartridge to the bag cup. Both hands are available, due to the snap-in at 55.

Figure 5:
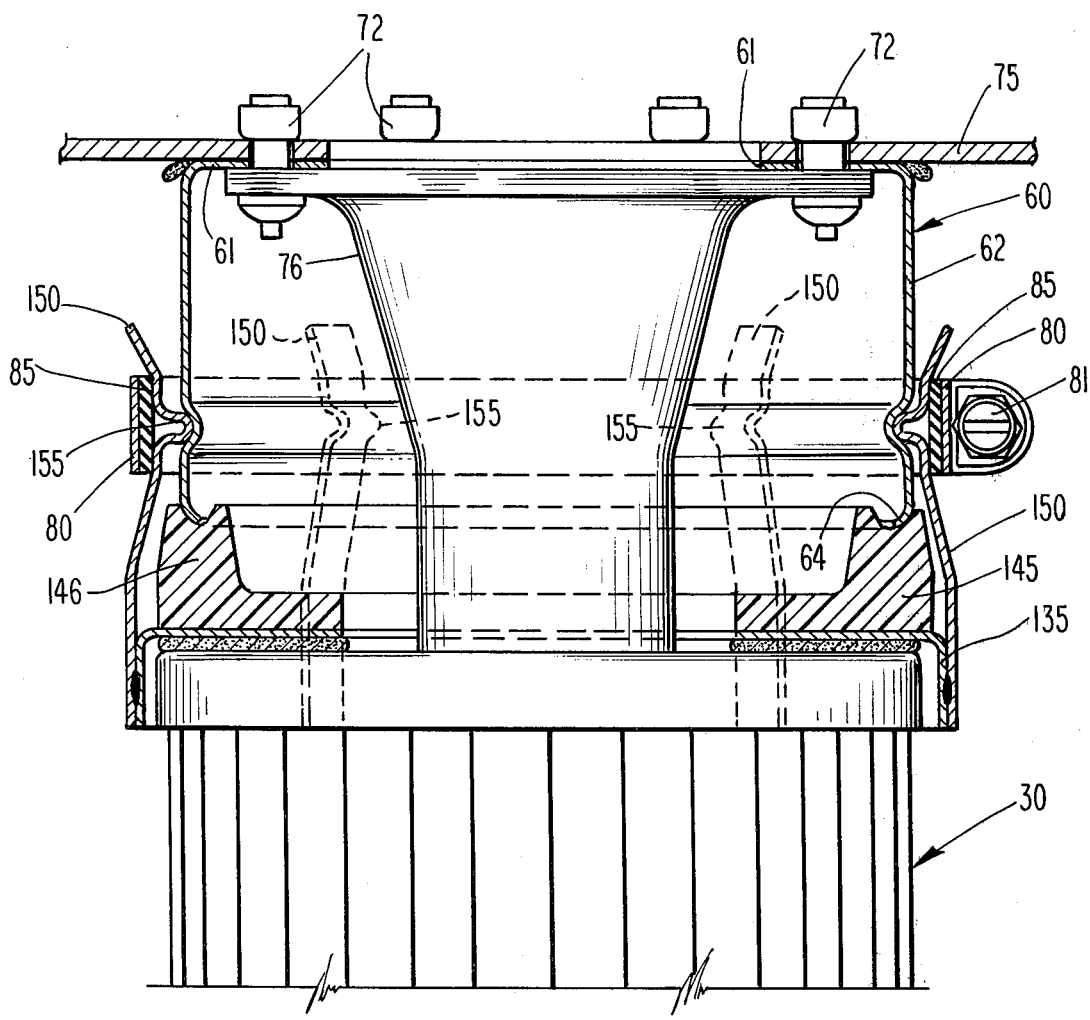
FIG. 5 is an elevational view of an alternate embodiment of the attachment means.

Reference is now made to FIG. 5 which shows a modified form of the present invention. As in the embodiment of FIG. 1, a bag cup 60 and a venturi nozzle 76 are suspended from the tube sheet 75, as by rivets 72. A principal difference between the embodiments of FIG. 5 and FIG. 1 is that, in FIG. 5, in lieu of the annular wire 55 of FIG. 1, each of the vertical spring metal fingers 150 is crimped to form an inwardly projecting fold or rib 155.

The function of rib 155 is the same as that of wire 55 of FIG. 1, i.e. to enable the sidewall 62 of the bag cup to cam the spring metal fingers 150 outwardly and to provide a latching member which will snap into the annular groove 63 of the bag cup. In FIG. 5, the clamp strap 80 is shown as having a resilient rubber strap 85 secured to its inner surface. Also, in FIG. 5, the annular cuff 145 is shown as having an upwardly extending rim portion 146 into which the rounded lowermost end 64 of the bag cup presses when the filter cartridge is pushed upwardly to its final latched position.

What is claimed is:

1. A dust filter baghouse comprising;
   A. a baghouse tube sheet having a plurality of holes therein;
   B. a small-diameter filter cartridge, said filter cartridge comprising a cylindrical perforated sleeve, an annular pleated filter media which encircles said sleeve, a collar secured to the upper end of said filter media, and an annular resilient cuff secured to the upper surface of said collar;
   C. attachment structure suspending said filter cartridge from said baghouse tube sheet, said attachment structure comprising:
   a. a cylindrical bag cup having a vertical sidewall;
   b. means suspending said bag cup from said tube sheet in registry with one of the holes therein;
   c. said bag cup having an annular groove in the sidewall thereof;
   d. a circular series of spaced apart generally vertical resilient fingers projecting upwardly from, and secured to, said cartridge collar, each of said fingers having an inward projection positioned and arranged such that the sidewall of said cup engages each of said inward projections on said fingers and cams said fingers radially outwardly, said projections subsequently coming into registry with said annular groove in the sidewall of said bag cup, whereupon said projections snap into said groove, thereby latching said filter cartridge to said bag cup, and
   e. clamp means for securing said finger projections in said bag cup groove in latching position.

2. The baghouse according to claim 1 wherein said inward projection on said fingers comprises an annular wire which is secured to each of said fingers.

3. The baghouse according to claim 1 wherein said inward projection comprises an inward fold in each of said fingers.

4. The baghouse according to claim 3 wherein said annular cuff is provided with an upwardly extending lip which engages the lowermost end of said bag cup.

5. A dust filter baghouse comprising;
   A. a baghouse tube sheet having a plurality of holes therein;
   B. a small diameter filter cartridge, comprising a cylindrical perforated sleeve, an annular pleated filter media which encircles said sleeve, and a collar secured to the upper end of said filter media and C. attachment structure suspending said filter cartridge from said baghouse tube sheet, said attachment structure comprising;
  a. a cylindrical bag cup having a vertical sidewall, said sidewall having at least one latching groove therein;
  b. means suspending said bag cup from said tube sheet in registry with one of the holes therein;
  c. a circular series of spaced apart generally vertical resilient fingers projecting upwardly from and secured to said collar, each of said fingers having an inward projection positioned and arranged such that the sidewall of said cup engages each of said inward projections on said fingers and cams said fingers radially outwardly, said projections subsequently coming into registry with said latching groove in the sidewall of said bag cup, whereupon said projections snap into said groove, thereby latching said filter cartridge to said bag cup;
  d. clamp means for securing said finger projections in said bag cup groove in latching position.

6. The baghouse according to claim 5 wherein an annular resilient cuff is secured to the upper surface of said collar, said cuff being in dust-sealing engagement with said bag cup.

7. The baghouse according to claim 6 wherein said annular cuff is provided with an upwardly extending lip which engages the lowermost end of said bag cup.

8. The baghouse according to claim 5 wherein said inward projections on said fingers comprise an annular wire which is secured to each of said fingers.

9. The baghouse according to claim 5 wherein said inward projections comprise an inward fold in each of said fingers.

* * * * *